United States Patent [19]

Fork

[11] 4,178,469

[45] Dec. 11, 1979

[54] CLOSURE DEVICE AND FLOOR STRUCTURE UTILIZING THE SAME

[75] Inventor: Frank W. Fork, Allison Park, Pa.

[73] Assignee: H. H. Robertson Company, Pittsburgh, Pa.

[21] Appl. No.: 926,846

[22] Filed: Jul. 21, 1978

[51] Int. Cl.² ............................................ H02G 3/28
[52] U.S. Cl. ...................................... 174/48; 52/221; 174/57
[58] Field of Search ................. 174/48, 49, 57, 95–98; 52/220, 221; 220/3, 7

[56] References Cited

U.S. PATENT DOCUMENTS

| | | | |
|---|---|---|---|
| 3,592,956 | 7/1971 | Fork | 174/97 X |
| 3,701,837 | 10/1972 | Fork | 174/49 X |
| 3,903,666 | 9/1975 | Fork | 174/49 X |
| 3,932,696 | 1/1976 | Fork et al. | 174/48 |
| 4,010,314 | 3/1977 | Kohaut | 174/48 |
| 4,012,873 | 3/1977 | Lindner | 174/49 X |

Primary Examiner—Bruce A. Reynolds
Assistant Examiner—D. A. Tone
Attorney, Agent, or Firm—Harry B. Keck; George E. Manias

[57] ABSTRACT

A closure device comprising an insert and capping means. The insert includes first, second and third generally U-shaped members. The first and second members cooperate with a lengthwise trough of the sheet metal element to provide laterally spaced-apart vertically presented chambers and a horizontal passageway therebetween. The capping means enclose those portions of the lengthwise trough on opposite sides of the first and second members to provide a substantially unobstructed additional raceway including the passageway. The third element which may be provided during installation of the closure device or during activation of the closure device caps the passageway and supports an electrical plug receptacle proximate to the finished surface of the floor for ready access. At least one additional electrical plug receptacle may be supported by either of the first and second members for access from the interior of one of the vertically presented chambers.

22 Claims, 18 Drawing Figures

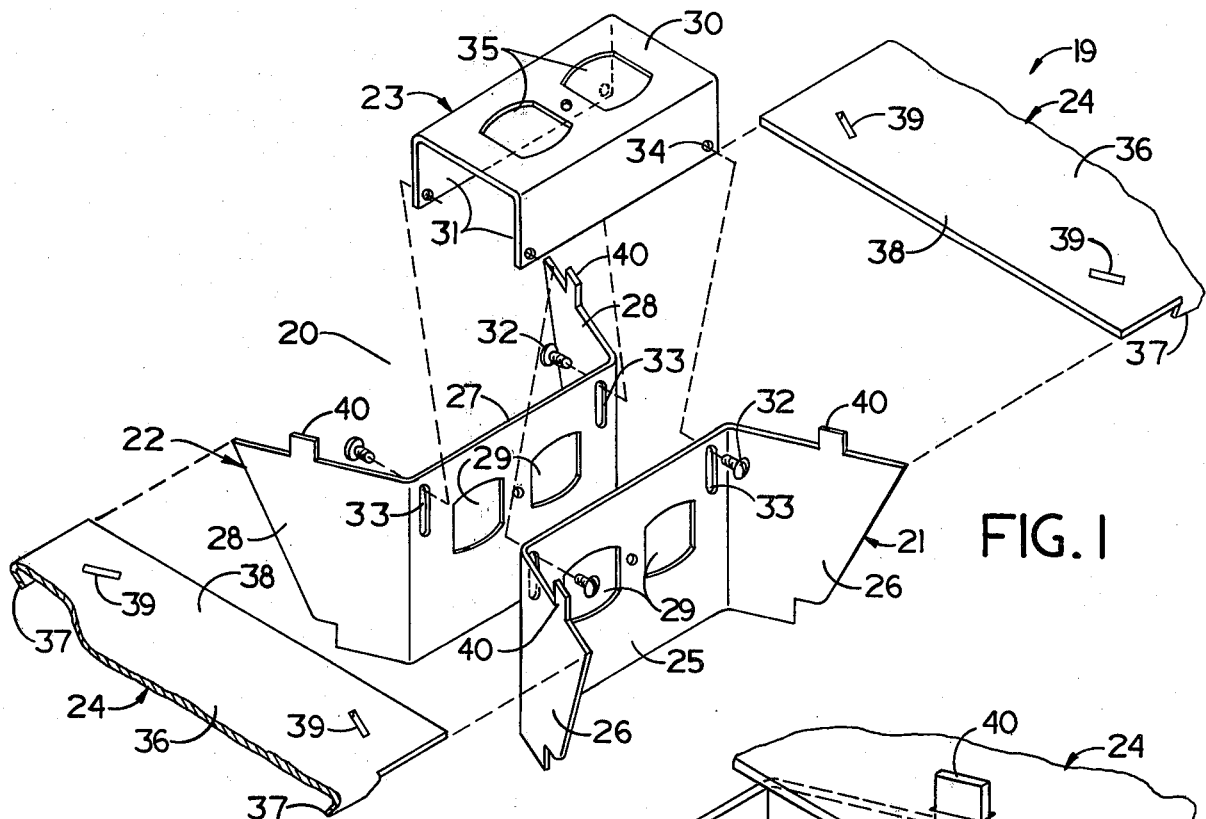
FIG. 1
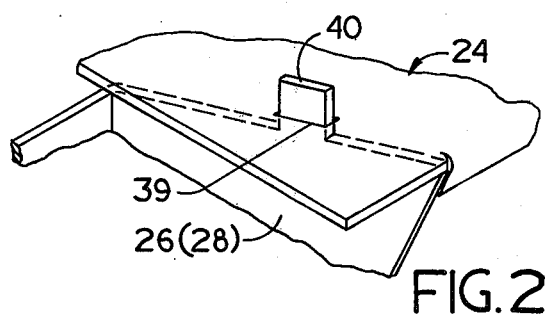
FIG. 2
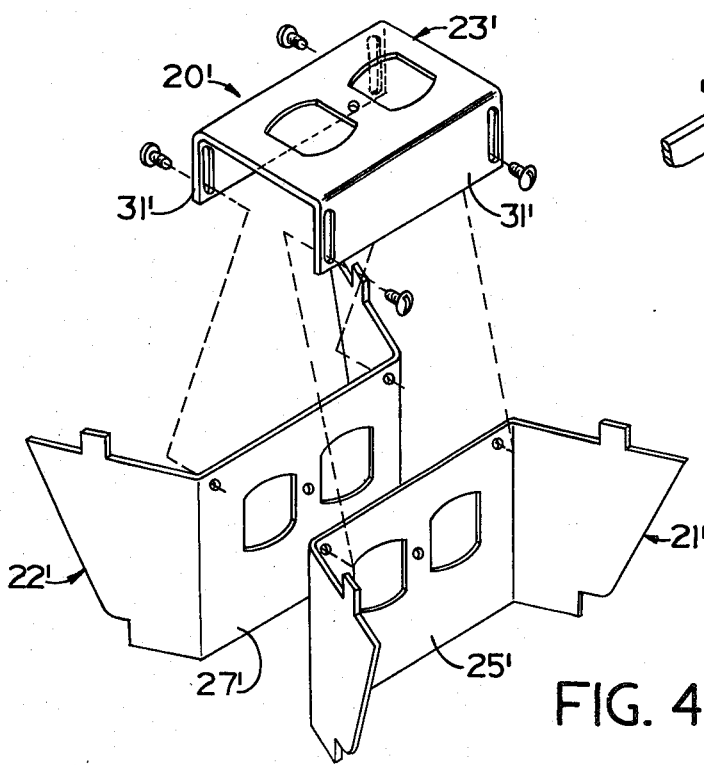
FIG. 4
FIG. 3

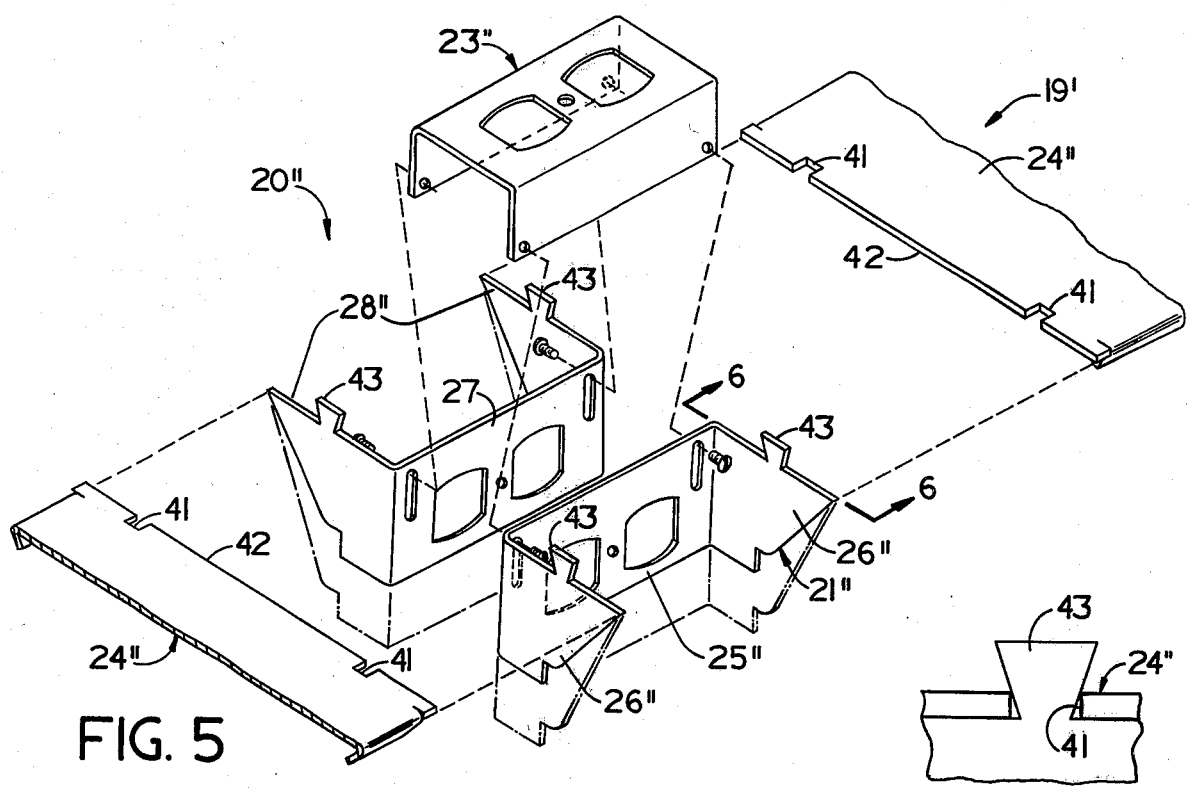
FIG. 5
FIG. 6
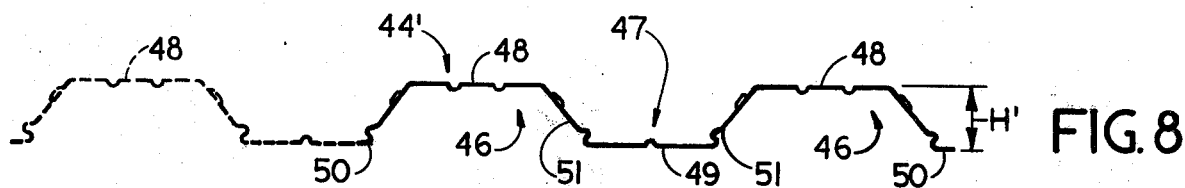
FIG. 8
FIG. 10
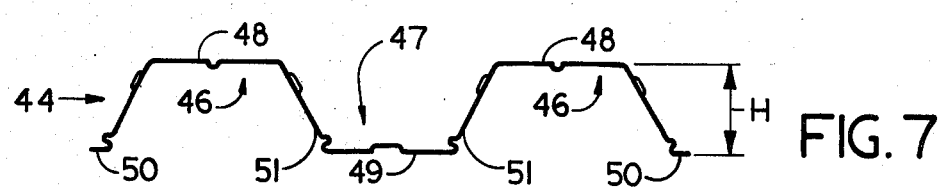
FIG. 7
FIG. 9

CLOSURE DEVICE AND FLOOR STRUCTURE UTILIZING THE SAME

BACKGROUND OF THE INVENTION

1. Field of the Invention

This invention concerns electrical wiring distributing floor structures; and more particularly an insert device for such floor structures.

2. Description of the Prior Art

Structures used in combination with junction boxes to provide an electrical power outlet receptacle flush or level with the floor surface are known in the prior art. See, for example, U.S. Pat. Nos. 2,033,602 (ADAM); 2,996,566 (STAS); 3,027,416 (KISSEL); 3,064,850 (KELLY, JR.); 3,956,573 (MYERS et al.). Because of their bulky configuration, such structures are not readily installable in cellular and non-cellular flooring elements.

Underfloor access housings are commonly used in the building industry in combination with cellular flooring units. One or more electrical receptacles are supported in fixed position within the housing and beneath the floor surface. See, for example, U.S. Pat. Nos. 3,701,837 (FORK); 3,932,696 (FORK et al.). Electrical connections to such receptacles are extremely difficult because of the limited interior space of the underfloor access housing, the narrow entrance to the access housing, and the position of the receptacle below the surface of the floor.

At least one attempt has been made to facilitate electrical power connections in underfloor access housings. That is, an electrical insert housing device is known which supports an electrical power outlet receptacle in two alternative positions. In a first position the receptacle is hidden within the insert housing. In a second position the electrical receptacle is substantially flush or level with the floor surface. See U.S. Pat. No. 3,972,579 (KOHAUT). Movement of the electrical receptacle between the two alternative positions exposes the electrical wiring thereof to possible fraying of the insulation and shorting out of the system.

SUMMARY OF THE INVENTION

The principal object of this invention is to provide a closure device including an insert which supports an electrical power plug receptacle horizontally and proximate to the surface of a floor structure for ready accessibility.

Another object of this invention is to provide a closure device which encloses a lengthwise trough of a sheet metal element thereby to provide an additional electrical passageway useful in distributing electrical power wiring.

Still another object of this invention is to provide an insert which is disposed entirely within the lengthwise trough of a sheet metal element and which provides access to three different electrical services at one location in the floor structure.

A further object of this invention is to provide a distribution unit comprising a corrugated single-skin sheet metal element having at least two lengthwise flutes which cooperate with the upper surface of a substructure to provide spaced-apart raceways for low voltage wiring, and at least one lengthwise trough between the flutes which is converted by the present closure device into an additional raceway for high voltage wiring.

A still further object of this invention is to provide an improved electrical wiring distributing floor structure incorporating the corrugated sheet metal element and closure device of this invention.

This invention constitutes an improvement over the metal cellular raceway section disclosed and claimed in U.S. Pat. No. 3,592,956; and the metal raceway section disclosed and claimed in copending U.S. patent application Ser. No. 874,535 filed Feb. 2, 1978—the above-identified patent and patent application being assigned to the assignee of this invention.

The present invention provides an insert for use with an underfloor distribution system to provide an electrical power plug receptacle at the surface of the floor. The insert comprises a first generally U-shaped member having a first vertical web, and first vertical flanges extending in the same direction from opposite ends of the first vertical web; a second generally U-shaped member having a second vertical web spaced-apart from and generally parallel with the first vertical web, and second vertical flanges extending from opposite ends of the second vertical web in a direction away from the first vertical flanges; and a third generally U-shaped member having a horizontal upper web, and depending flanges adjacent to the first and second vertical webs. Securing means is provided which secure the third U-shaped member to the first and second U-shaped members in vertically adjustable relation therewith. The upper web of the third U-shaped member is provided with knock-outs adapting the web to support an electrical plug receptacle proximate to the upper surface of a floor structure to facilitate electrical plug connections. The vertical web of at least one of the first and second U-shaped members may be provided with knock-outs adapting the web to support an additional plug receptacle.

The present invention also provides a distribution unit of the type adapted to be embedded in a concrete floor structure to provide parallel raceways. The distribution unit includes a sheet metal section presenting alternating crests and valleys connected by webs and presenting at least one lengthwise trough defined by one of the valleys and the confronting webs connected thereto. Opposed access openings are provided in the confronting webs. The first and second U-shaped members of the present insert are vertically disposed within and cooperate with portions of the lengthwise trough to provide spaced-apart vertically presented chambers each including one of the web access openings, and a passageway between the first and second U-shaped members. First and second capping means enclose those portions of the lengthwise trough on opposite sides of the insert thereby to provide a substantially unobstructed additional raceway including the passageway. In a preferred arrangement, the third generally U-shaped member is not installed until after the distribution is embedded in the floor structure and the insert is activated. A closure cap is secured to the sheet metal section in covering relation with the chambers and the passageway to preclude ingress into the chambers and the passageway of a subsequently poured covering layer of concrete. Alternatively, the third generally U-shaped member may be installed in capping relation with the passageway prior to installing the closure cap.

The sheet metal section of the present distribution unit may comprise a corrugated single-skin sheet metal element which presents alternating lengthwise flutes and lengthwise troughs. The flutes cooperate with the upper surface of a substructure to provide spaced-apart raceways for distributing low voltage wiring, such as telephone and special services wiring. The additional raceway formed, in part, by the present closure device is used to distribute high voltage power wiring. Access to the different electrical services is provided by each insert at one location in the floor structure.

The present distribution unit can be embedded in a concrete floor structure to provide an improved electrical wiring distributing floor structure. After the covering layer of concrete has hardened, the concrete is broken away and the closure cap is removed. In the preferred arrangement, the third U-shaped member is provided having an electrical receptacle secured to its upper web. The wiring connections to the electrical receptacle are made and thereafter the third U-shaped member is secured to the first and second U-shaped members in covering relation with the passageway. The third U-shaped member is positioned such that the electrical receptacle is presented proximate to the upper face of the floor structure. Thereafter, cover means is installed in covering relation with the chambers and the electrical receptacle. The cover means, including removable covers, provides easy access to the chambers and to the electrical receptacle from the upper face of the floor structure.

BRIEF DESCRIPTION OF THE DRAWINGS

FIG. 1 is an exploded isometric view illustrating the present closure device;

FIGS. 2 and 3 are fragmentary isometric views illustrating a twist-tab connection between capping means and a vertically presented U-shaped member of the closure device of FIG. 1;

FIG. 4 is an exploded isometric view illustrating an alternative embodiment of the present closure device;

FIG. 5 is an exploded isometric view illustrating a further alternative embodiment of the present closure device;

FIG. 6 is a fragmentary view as viewed from the line 6—6 of FIG. 5;

FIG. 7 through 10 are end views schematically illustrating sheet metal sections which may be used in combination with the closure device of FIGS. 1, 4 and 5;

DESCRIPTION OF THE PREFERRED EMBODIMENT(S)

FIG. 1 illustrates the preferred embodiment of the present closure device 19. The closure device 19 comprises, in general, an insert 20 including first, second, and third generally U-shaped members 21, 22, 23; and capping means such as infill plates 24.

Figure 13:
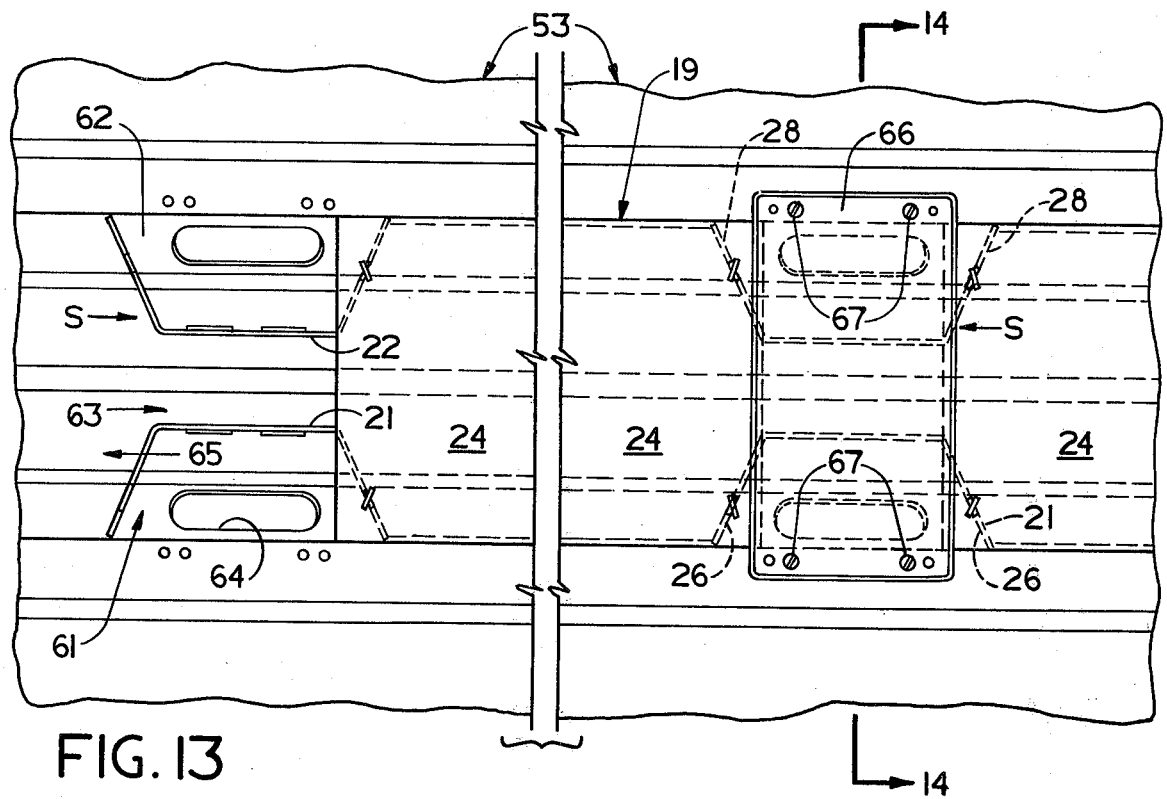
FIG. 13 is a broken plan view of the distribution unit of FIG. 12 with parts removed to show details.

The first U-shaped member 21 presents a first vertical web 25 and first vertical flanges 26 extending in the same direction from opposite ends of the first vertical web 25. The second U-shaped member 22, disposed in opposed relation with the first U-shaped member 21, presents a second vertical web 27 and second vertical flanges extending from opposite ends of the second vertical web 27 in a direction away from the first vertical flanges 26. In this embodiment, the vertical flanges 26, 28 of the members 21, 22 diverge outwardly from the adjoining vertical webs 25, 27 and are adapted, as shown in FIG. 13, to extend beneath the infill plates 24. As will be described, the infill plates 24 are positively connected in electrically grounded relation to the U-shaped members 21, 22.

Knock-outs 29 may be provided in one or both of the vertical webs 25, 27 which adapt the webs 25, 27 to support an electrical plug receptacle.

The third U-shaped member 23 presents a horizontal web 30 and downwardly depending flanges 31 positioned to reside between the first and second vertical webs 25, 27. Securing means, such as plural fasteners 32, secure the third U-shaped member 23 to the first and second U-shaped members 21, 22 for vertical adjustment relative thereto. Each of the fasteners 32 is positioned to extend through a vertical slot 33 formed in the vertical web 25 (27) into threaded engagement with a threaded opening 34 formed in the depending flanges 31. The arrangement is such that the horizontal web 30 of the third member 23 may be disposed substantially flush with the upper edges of the vertical flanges 25, 27 and may be adjusted vertically therefrom to a desired elevation, as will be described. Knock-outs 35 are provided in the horizontal web 30 which adapt the third U-shaped member 23 to support an electrical plug receptacle (not illustrated) horizontally and proximate to the upper surface of a floor structure, as will be described.

Each of the infill plates 24 comprises a central pan 36 having depending flanges 37 extending downwardly from the opposite longitudinal edges thereof. The infill plates 24 are adapted to enclose portions of a lengthwise trough presented by a sheet metal section.

It will be observed in FIG. 1 that each of the infill plates 24 has a leading end portion 38 extending beyond the depending flanges 37. Each of the leading end portions 38 is adapted to overlap the upper edges of adjacent vertical flanges 26, 28. Connecting means is provided which connects each leading end portion 38 to at least one and preferably both of the adjacent vertical flanges 26, 28 in electrically grounded relation therewith. The connecting means may comprise slots 39 formed in the leading end portion 38, and vertically presented tabs 40 formed along the upper edges of the adjacent flanges 26, 28. Each vertically presented tab 40 extends upwardly through one of the slots 39 (FIG. 2). The upper portion of the tab 40 is twisted (FIG. 3) thereby connecting the infill plate 24 to the vertical flange 26 (28) in electrically grounded relation therewith.

FIG. 4 illustrates an alternative embodiment of the insert 20' wherein the first and second members 21', 22' have first and second vertical webs 25', 27' positioned to reside between the depending flanges 31' of the third U-shaped member 23'.

FIG. 5 illustrates a further alternative embodiment of the closure device 19'. An insert 20" is provided wherein the first and second vertical flanges 26', 28' of each first and second U-shaped member 21", 22" extend generally perpendicularly from the vertical webs 25", 27". Connecting means also is provided which comprises open-ended slots 41 formed in the leading end 42 of each infill plate 24"; and keystone-shaped tabs 43 formed at the upper edges of the first and second vertical flanges 26", 28". Each of the keystone-shaped tabs 43 fits snugly within the open-ended slot 41 (FIG. 6) thereby providing an electrically grounded connection therebetween.

The first and second U-shaped members 21, 22 of FIGS. 1, 4 and 5 may have a height corresponding to that of the sheet metal section on which it is installed. For example, the members 21, 22 may have a web height of approximately 3 inches (7.62 cm) adapting them for use with deep sheet metal sections such as illustrated in FIGS. 7 and 9; or a web height of approximately 2 inches (5.08 cm) adapting them for use with shallower sheet metal sections such as illustrated in FIGS. 8 and 10. The members 21, 22, 23 of FIGS. 1, 4 and 5 may be fabricated from metal-coated steel sheets having a thickness of from 0.0359 to 0.0598 inches (0.912 to 1.52 mm). The infill plates 24 may be fabricated from metal-coated steel sheets having, for example, a thickness of 0.0359 inches (0.0912 cm).

SHEET METAL SECTIONS

The present closure device is adapted for use with corrugated single-skin sheet metal sections 44, 44' (FIGS. 7 and 8) and with cellular sheet metal sections 45, 45' (FIGS. 9, 10). The corrugated single-skin sheet metal sections 44, 44' present at least two lengthwise flutes 46 and a lengthwise trough 47 disposed therebetween. Each of the single-skin sheet metal sections 44, 44' presents at least two crests 48, an intermediate valley 49, lateral valley flanges 50, and inclined webs 33 connecting each of the crests 48 to the intermediate valley 49 and to the valley flange 50.

Cellular sheet metal sections 45, 45' (FIGS. 9, 10) may be provided by securing a correlative lower sheet metal element 52 to the single-skin sheet metal sections 44, 44' of FIGS. 7 and 8.

Typically, the sections 44, 44' and 45, 45' have a width of 20.875 inches (53.02 cm). The crests 48 and the intermediate valley have a width of 4.75 inches (12.07 cm). The lateral valleys 50 each have a width of 0.8125 inches (2.06 cm). The distance between the crests 48 is 7.25 inches (18.42 cm). The distance between the intermediate valley 49 and each of the lateral valleys 50 is 7.25 inches (18.42 cm). The sections 44, 45 have a height H of 3 inches (7.62 cm) whereas the sections 44', 45' have a height H' of 2 inches (5.08 cm). The sections 44, 44', 45, 45' may be formed from sheet metal having a thickness of from 0.0359 to 0.0598 inches (0.912 to 1.52 mm).

The sections 44, 44' and 45, 45' may be provided with more than two of the crests 48 as illustrated in FIGS. 8 and 10. Sections having three of the crests 48 have a width of 32.875 inches (83.50 cm).

DISTRIBUTION UNIT

Figure 11:
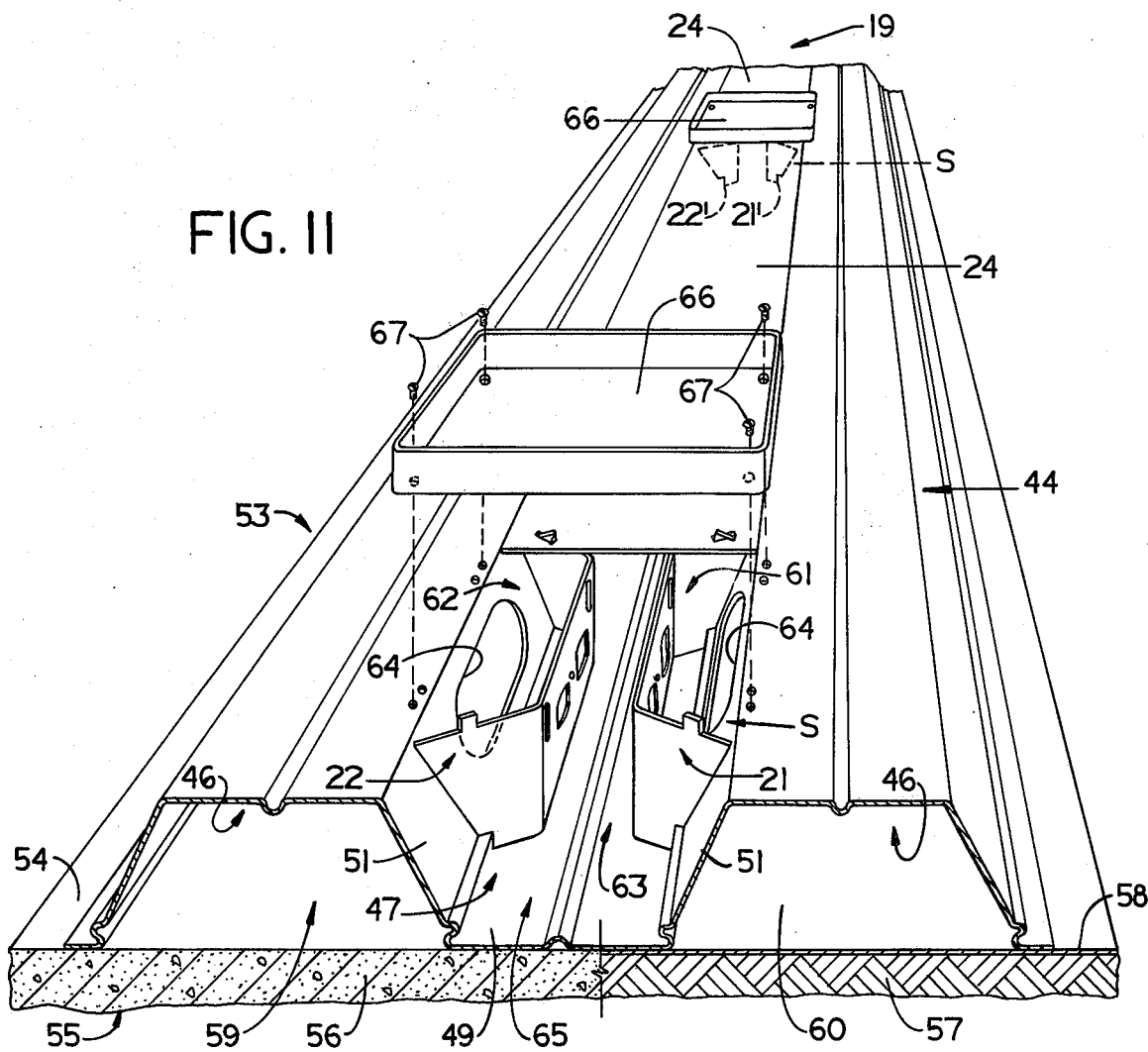
FIG. 11 is an exploded perspective view illustrating the present distribution unit.

The present invention provides an improved distribution unit 53 which, as shown in FIG. 11, is adapted to overlie and be supported on an upper face 54 of a substructure 55. The substructure 55 may comprise a structural slab 56 or a compacted layer 57 of stone, earth or sand covered by a vapor barrier 58. In the preferred arrangement, the distribution unit 53 utilizes the corrugated single-skin sheet metal section 44 wherein the lengthwise troughs 46 thereof cooperate with the upper surface 54 of the substructure 55 to provide raceways 59, 60. The raceways 59, 60 are used to distribute low voltage wiring (not illustrated), such as telephone and special services wiring.

In the preferred embodiment, the distribution unit 53 (FIGS. 11 to 13) utilizes certain elements of the closure device 19, that is, the first and second U-shaped members 21, 22 and the infill plates 24. As best shown in FIG. 11 the first and second U-shaped members 21, 22 are vertically disposed within the lengthwise trough 47 and cooperate with the inclined webs 51 and with portions of the intermediate valley 49 to provide (a) spaced-apart vertically presented chambers 61, 62; and a central horizontal passageway 63 presented between the members 21, 22. An access opening 64 formed in each of the webs 51 provides access between the raceways 59, 60 and the chambers 61, 62 for passage of electrical wiring.

The capping means, that is, the infill plates 24, enclose those portions of the lengthwise trough 47 on opposite sides of the U-shaped members 21, 22 thereby to provide a substantially unobstructed additional raceway which includes the passageway 63. The additional raceway 63, being totally enclosed by metal walls, serves to distribute high voltage power wiring (not illustrated).

A protective cap 66 is provided for each set S of U-shaped members 21, 22. The closure cap 66 is secured to the sheet metal section 44 by fasteners 67.

Figure 12:
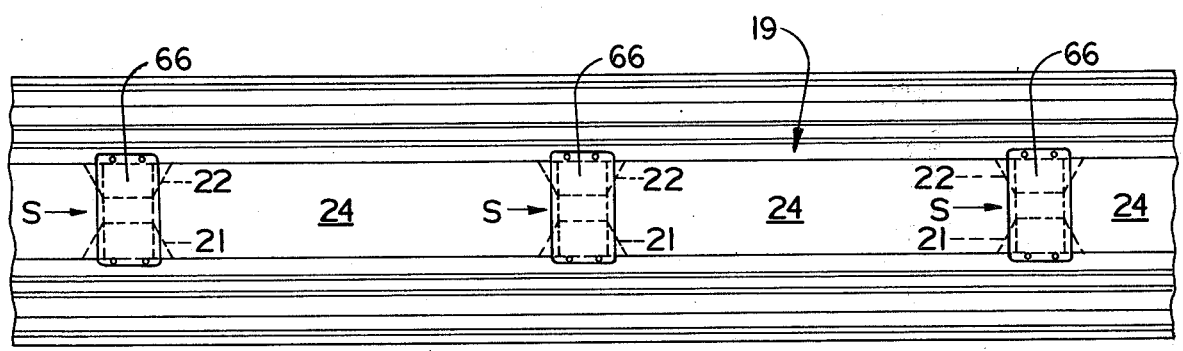
FIG. 12 is a plan view of the distribution unit of FIG. 11.

As best shown in FIGS. 12 and 13, a set S of the first and second U-shaped members 21, 22 is provided at longitudinally spaced-apart locations along the length of the distribution unit 53. The spacing between adjacent sets S may vary from 2.0 to 5.0 feet (0.61 to 1.52 meters). Each of the closure caps 66 is disposed in covering relation with the vertically presented chambers 61, 62 and the horizontal passageway 63.

In this preferred arrangement, installation of the third U-shaped member 23 (FIGS. 1, 4) is delayed until selected ones of the sets S of U-shaped members is activated as will hereinafter be described.

Figure 14:
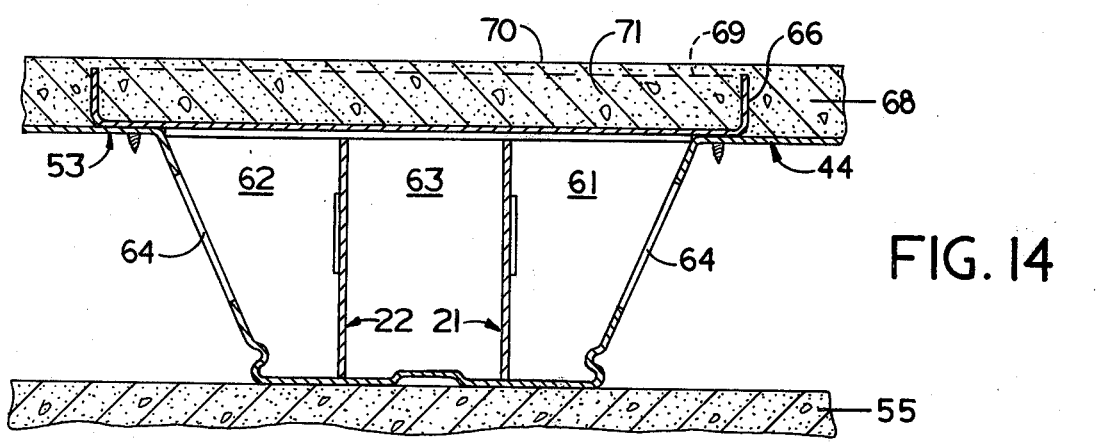
FIG. 14 is a cross-sectional view taken along the line 14—14 of FIG. 13 having an overlying layer of concrete covering the distribution unit.

FIG. 14 illustrates the distribution unit 53 having a layer 68 of concrete overlying the upper surface thereof. The protective cap 66 precludes ingress of the concrete 68 into the vertically presented chambers 61, 62 and the horizontal passageway 63. The protective cap 66 presents an upper peripheral edge 69 proximate to the concrete upper surface 70, which facilitates removal of the protective cap 66 and that concrete portion 71 disposed within the cap 66.

Figure 15:
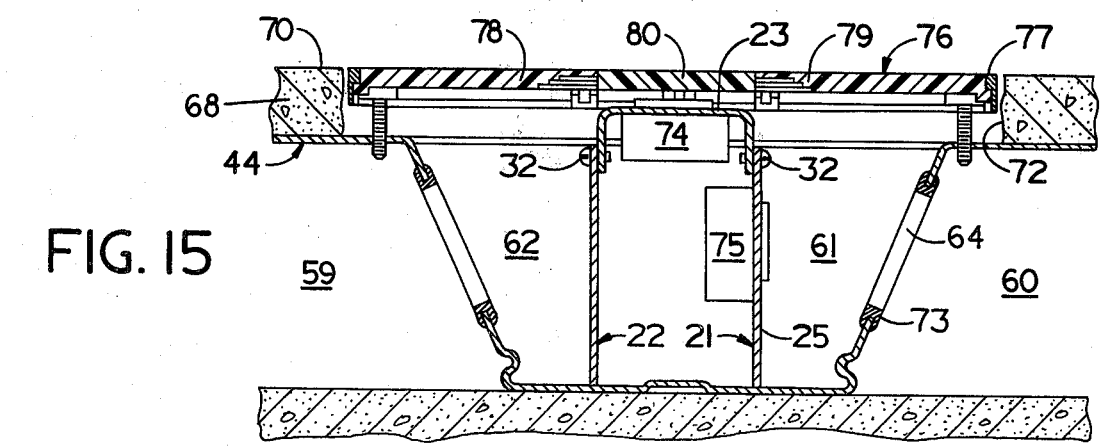
FIG. 15 is a cross-sectional view taken along the line 15—15 of FIG. 16.

As shown in FIG. 15, removal of the protective cap 66 and the concrete portion 71 provides an access passageway 72 for gaining access to the chambers 61, 62 and the passageway 63. A suitable grommet 73 is installed in each of the web access openings 64 to preclude fraying of electrical wiring passing therethrough.

Thereafter, an electrical plug receptacle 74 is attached to the third U-shaped member 23. The U-shaped member 23 is secured to the U-shaped members 21, 22 by the fasteners 32. The electrical plug receptacle 74 is horizontally presented and proximate to the upper surface 70 of the overlying concrete layer 68. If desired, a second plug receptacle 75 may be provided prior to installing the third U-shaped member 23. The second plug receptacle 75 may, for example, be secured to the vertical web 27 of the second U-shaped member 22 and presented for electrical connections through the vertically presented chamber 62.

Figure 16:
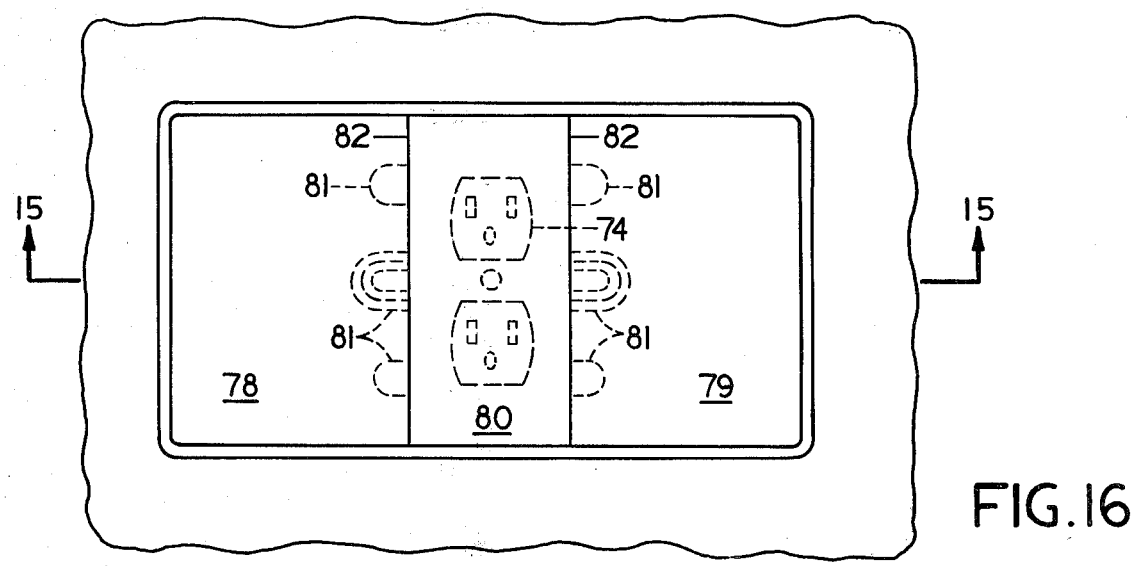
FIG. 16 is a fragmentary plan view illustrating cover means installed on activation of the present insert.

Cover means 76 is then installed in covering relation with the chambers 61, 62 and the plug receptacle 74. The cover means 76 (FIGS. 15, 16) may comprise a support element 77 supporting individual cover plates 77 through 80. The support element 77 is supported on and secured to the sheet metal section 44 in substantially flush relation with the upper surface 70 of the concrete layer 68. The cover plates 78, 79 are individually removable to provide access to the vertically presented chambers 61, 62, respectively. Each of the cover plates 78, 79 is provided with a plurality of weakened areas 81 adjacent to the opposite edges 82 of the central cover 80. The weakened edges 82 may be removed to allow electrical wiring to pass upwardly from the individual chambers 61, 62. The central cover 80 also is removable to expose the electrical plug receptacle 74 for direct plug connections.

Figure 17:
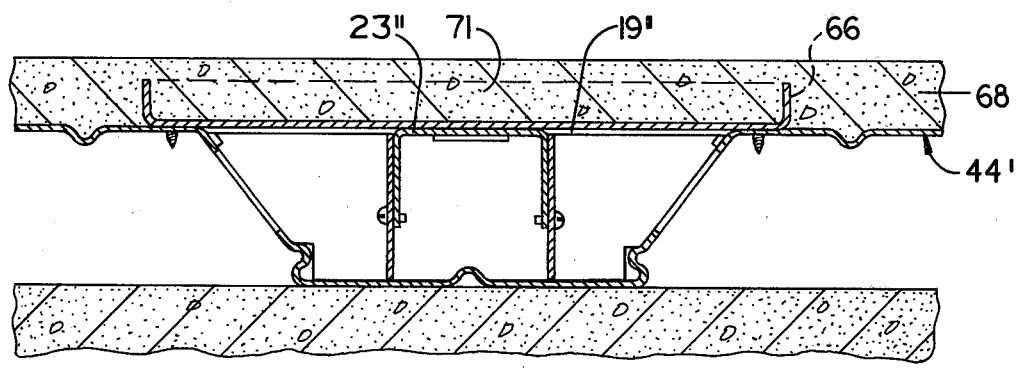
FIG. 17 is a cross-sectional view, similar to FIG. 14, illustrating the insert of FIG. 5 in an unactivated state.
Figure 18:
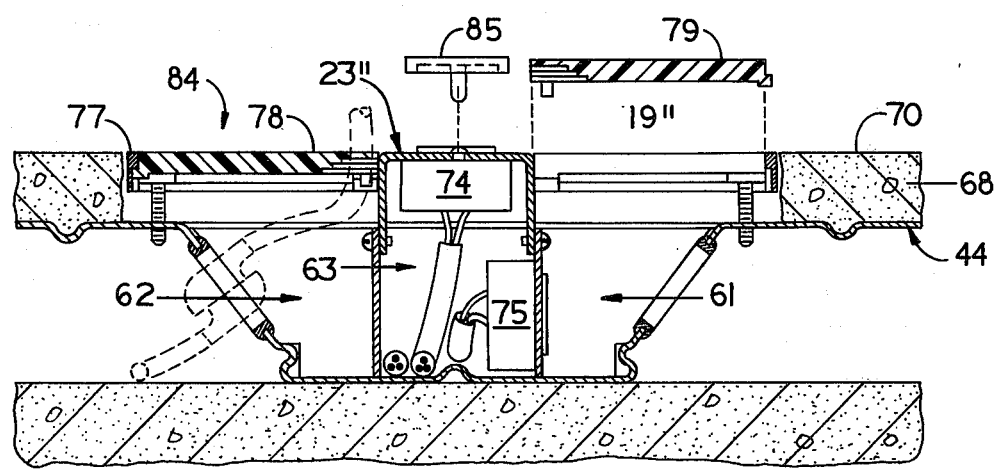
FIG. 18 is a cross-sectional view, similar to FIG. 15, illustrating activation of the insert of FIG. 5.

FIGS. 17 and 18 illustrate the closure device 19″ of FIG. 5 installed in the shallower sheet metal section 44′; and the arrangement wherein the third U-shaped member 23″ is installed prior to securing the closure cap 66 to the sheet metal section 44′.

When the protective cap 66 and the concrete portion 71 are removed, the third U-shaped member 23″ is removed and the electrical plug receptacle 74 is secured thereto. Electrical connection may be made between the plug receptacle 74 and power wiring 83. If desired, a second plug receptacle 75 may be secured, for example, to the first U-shaped member 21. The third U-shaped member 23″ is installed with the plug receptacle 74 substantially flush with the upper surface 70 of the overlying concrete layer 68. Cover means 84 is provided comprising the support element 77 and the chamber cover plates 78, 79.

It will be observed in FIG. 18 that the electrical plug receptacle 74 is exposed at all times between the cover plates 78, 79. A suitable protective member 85 may be provided to preclude ingress of fluids and dirt into the electrical plug receptacle 74. Alternatively, a plug receptacle (not illustrated) of the type providing plural electrical outlets may be plugged into the receptacle 74. When such a receptacle is provided, the second plug receptacle 75 need not be installed.

I claim:

1. An electrical insert for use with an electrical underfloor distribution system to provide an electrical power outlet at the surface of the floor, said device comprising:
    a first generally U-shaped member having a first vertical web, and first vertical flanges extending in the same direction from opposite ends of said first vertical web;
    a second generally U-shaped member having a second vertical web spaced-apart from and generally parallel with said first vertical web, and second vertical flanges extending from opposite ends of said second vertical web in a direction away from said first flanges;
    a third generally U-shaped member having a horizontal upper web, and depending flanges adjacent to the first and second vertical webs;
    securing means securing said third U-shaped member to the first and second U-shaped members in vertically adjustable relation therewith.

2. The insert of claim 1 wherein said upper web includes knock-outs adapting said upper web to support an electrical receptacle in the region beneath said upper web.

3. The insert of claim 1 wherein each said securing means includes at least one fastener having a fastener head residing within one of said chambers.

4. The insert of claim 1, 2 or 3 wherein said depending flanges extend downwardly between the first and second vertical webs.

5. The insert of claims 1, 2 or 3 wherein the first and second vertical webs are presented between said depending flanges.

6. The insert of claim 1 wherein at least one said vertical web includes knock-outs adapting the same to support an electrical receptacle in the region between the first and second vertical webs.

7. The insert of claim 1 wherein the vertical flanges of each first and second U-shaped member are normal to the adjoining vertical web.

8. The insert of claim 1 wherein the vertical flanges of each first and second U-shaped member diverge outwardly from the adjoining vertical web.

9. The insert of claim 1 wherein at least one vertical flange of each first and second member includes a connecting tab extending above an upper edge thereof.

10. A distribution unit adapted to be embedded in a concrete floor and to provide parallel raceways, including:
    a sheet metal section presenting alternating crests and valleys connected by webs and presenting at least one lengthwise trough defined by one of said valleys and the confronting webs connected thereto;
    opposed access openings in said confronting webs;
    first and second U-shaped members vertically disposed within said trough, said members cooperating with said confronting webs and with said one of said valleys to provide (a) spaced-apart vertically presented chambers each including one of said access openings, and (b) a passageway between said first and second U-shaped members;
    first and second capping means enclosing those portions of said lengthwise trough on opposite sides of said U-shaped members thereby to provide a substantially unobstructed additional raceway including said passageway; and
    a closure cap secured to said sheet metal section in covering relation with said chambers and with said passageway.

11. The distribution unit of claim 10 including means connecting each of said capping means to at least one of said first and second U-shaped members in electrically grounded relation therewith.

12. The distribution unit of claim 10 wherein each of the first and second U-shaped members includes a vertical web and vertical flanges extending therefrom normal to the confronting web.

13. The distribution unit of claim 10 wherein each of the first and second U-shaped members includes a vertical web and vertical flanges diverging outwardly from said vertical web toward the confronting web.

14. The distribution unit of claim 12 or 13 wherein at least one of the vertical webs includes knock-outs adapting the U-shaped member to support an electrical receptacle within said passageway.

15. The distribution unit of claim 10 wherein said metal section comprises a corrugated sheet presenting lengthwise flutes disposed on opposite sides of said lengthwise trough, said lengthwise flutes being adapted to cooperate with an upper surface of a supporting structure to provide said parallel raceways.

16. The distribution unit of claim 10 wherein said metal section comprises a cellular section including a corrugated upper element and a correlative lower element secured to said upper element along contiguous portions thereof.

17. The distribution unit of claim 10 including
a third generally U-shaped member disposed beneath said closure cap and in capping relation with said passageway, said third U-shaped member having a horizontal web including knock-outs adapting said third member to support an electrical receptacle within said passageway; and
securing means securing said third U-shaped member to said first and second U-shaped members in vertically adjustable relation therewith.

18. The distribution unit of claim 17 wherein said third U-shaped member includes depending flanges disposed between said first and second U-shaped members.

19. The distribution unit of claim 17 wherein said third U-shaped member includes depending flanges, one disposed within each of said chambers.

20. In an electrical wiring distributing floor structure comprising a substructure, a distribution unit supported on said substructure and presenting at least one lengthwise trough defined by a valley and confronting webs connected to said valley, spaced generally parallel raceways defined in part by said distribution unit, and a covering layer of concrete, the improvement comprising:
opposed access openings in said confronting webs;
an insert device disposed within said trough and comprising first, second and third members of generally U-shaped configuration;
the first and second U-shaped members being vertically disposed within said trough and cooperating with said confronting webs and with said valley to provide spaced-apart vertically presented chambers each including one of said access openings;
the third U-shaped member being secured to and cooperating with said first and second U-shaped members and with said valley to provide a horizontal passageway, said third U-shaped member having a generally horizontal upper web proximate to an upper face of said floor structure;
an electrical receptacle supported by said upper web substantially at said upper face of said floor structure;
first and second capping means enclosing those portions of said lengthwise trough on opposite sides of said insert device thereby to provide a substantially unobstructed additional raceway including said passageway; and
cover means supported in covering relation with said chambers and with said electrical receptacle and providing access to said chambers and to said electrical receptacle from said upper face of said floor structure.

21. The floor structure of claim 20 including a second electrical receptacle supported by one of said first and second U-shaped members and being accessible for electrical connections through one of said chambers.

22. The floor structure of claim 20 including means connecting each of said capping means to at least one of said first and second U-shaped members in electrically grounded relation therewith.

* * * * *